United States Patent Office 3,304,251
Patented Feb. 14, 1967

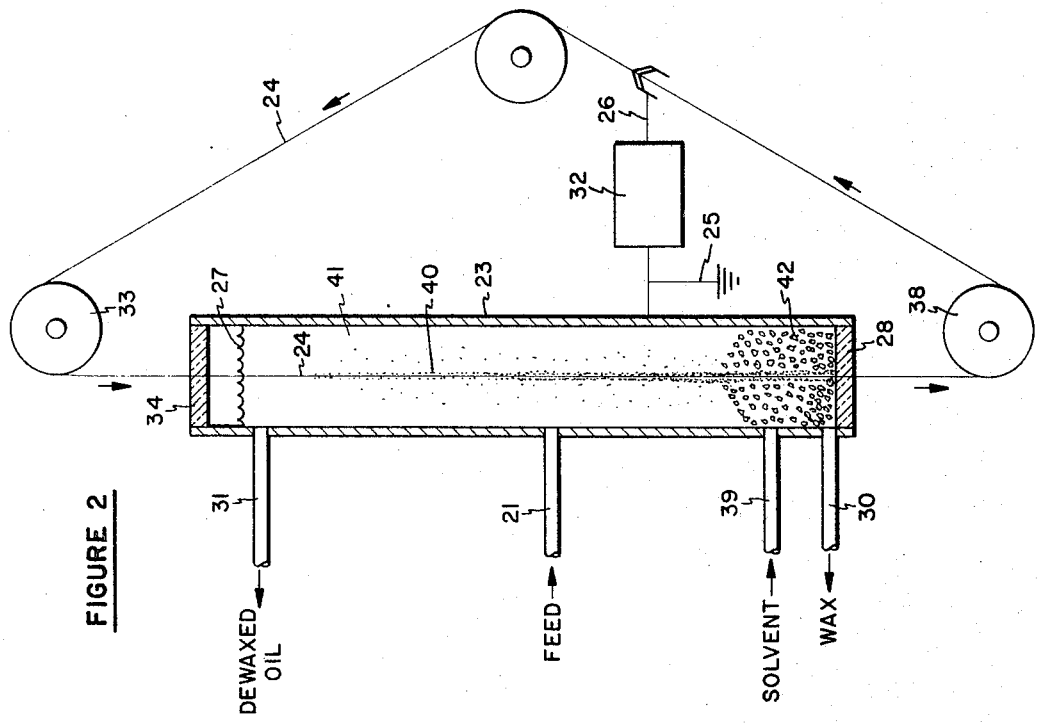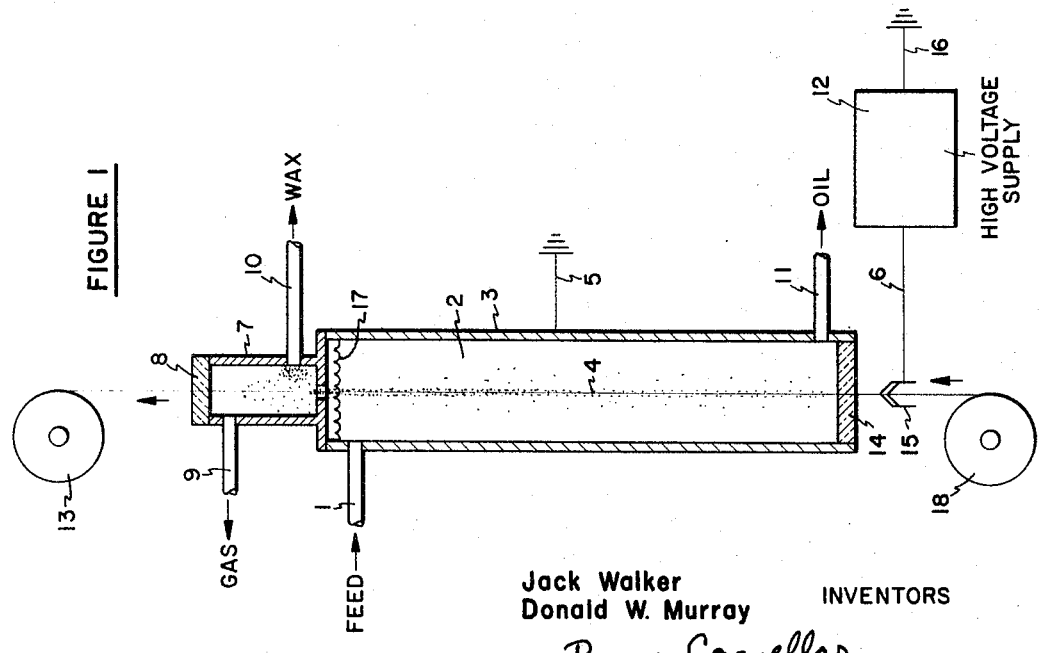

3,304,251
SEPARATION OF WAX FROM AN OIL DISPERSION USING A NON-UNIFORM ELECTRIC FIELD
Jack Walker and Donald W. Murray, Sarnia, Ontario, Canada, assignors to Esso Research and Engineering Company, a corporation of Delaware
Filed Mar. 14, 1962, Ser. No. 179,734
13 Claims. (Cl. 204—184)

The present invention is concerned with a process and apparatus for the separation of solids in non-uniform electric fields. Particularly, the invention relates to the separation of adhesive solids from a dispersion of said solids by contacting the dispersion with a non-uniform electric field wherein a moving surface comprises one of the electrodes.

Specifically, the invention relates to the separation of crystallized wax from a wax-oil slurry dispersion by contacting the slurry with a non-uniform electric field wherein a moving surface comprises one of the electrodes and the dispersed wax adheres to the moving electrode and is removed from the dispersion. The invention especially relates to a process in which a waxy mineral oil is diluted with a solvent and is chilled to a temperature such that wax is crystallized and precipitated from the oil. The precipitated wax is thereafter separated from the solvent oil mixture by contacting the mixture with a non-uniform electric field, wherein the precipitated wax migrates and adheres to the moving wire electrode and is thereby removed from the mixture.

The dewaxing of mineral oils is a procedure that is well known in the petroleum industry. It finds particular application in the removal of wax and wax haze from waxy petroleum oil fractions. These fractions generally boil in the range of 250 up to 580° F. for middle distillates, 580 to 850° F. for paraffin distillates, and 800 to 1000° F. for heavy lubricating oil distillates.

In carrying out the invention, one of the conventional dewaxing procedures can be used to treat one of the above types of waxy oil petroleum distillates to precipitate the wax. The general technique for dewaxing a lubricating oil fraction consists basically of lowering the solubility of the wax in the oil, precipitating and separating the wax. This is accomplished by lowering the temperature of the oil to a temperature at which the wax precipitates and/or by adding a solvent which has a low solubility for the wax and a relatively high solubility for the oil.

Solvents that are conventionally employed for solvent dewaxing operations serve several functions; they lower the solubility of the wax in the oil and form a wax precipitate of a structure that can be removed from the oil; they lower the viscosity of the oil sufficiently to make rapid separation possible; and they are used as autorefrigerants. In this invention, they also provide a dielectric continuous phase for the separation.

Various known dewaxing processes, such as propane and ketone dewaxing, have been widely used commercially to separate wax from wax-oil fractions. Solvents that are normally used for dewaxing petroleum fractions are materials such as petroleum naphthas, aliphatic ketones, halogenated low molecular weight hydrocarbons; mixtures of aromatic hydrocarbons such as benzene or toluene and ketones such as acetone, methyl ethyl ketone, normal propyl ketone; liquefied normally gaseous hydrocarbons, such as propane, which serve simultaneously as dewaxing solvents and also as auto-refrigerants.

The commercial processes, however, have several disadvantages which it would be desirable to overcome. The filtration of wax crystals from the wax slurry formed during dewaxing is difficult, and often the filtration rate of the slurry limits the capacity of the entire process. Separation by filtration or, for that matter, by centrifugation, necessitates a large investment in filtration and centrifugation apparatus. It is found that the filters that are used frequently become clogged and the process must be stopped periodically to clean and free the filters.

Also, in this type of separation, the crystal size of the precipitated wax is critical and necessitates careful control of the cooling of the waxy oil solvent mixture in order to avoid shock chilling. Shock chilling of the waxy oil solvent mixture produces a great many small crystals and wax fines which tend to clog the filter apparatus and reduces separation rates. In view of these problems, it would be very desirable to find a more efficient means of separating the precipitated wax from the waxy oil slurry and one that was not sensitive to crystal size.

The object of this invention is to provide an improved technique and apparatus whereby adhesive solids may be separated from a dispersion containing the solids. A further object of this invention is to provide an improved technique whereby precipitated wax crystals may be separated from a waxy oil slurry. Other objects of the invention will be apparent as the description of the invention proceeds.

In accordance with this invention, a dispersion containing wax solids is contacted with a non-uniform electric field. In a non-uniform electric field, particles in a less-polar suspension medium migrate to and accumulate where the field is strongest. This movement does not require the particles to be charged but depends instead on the force experienced by all polarizable materials in non-uniform electric fields. The uncharged particle is believed to be polarized by the applied voltage and, consequently, moves due to the unequal pulls exerted by the forward and backward direction of the non-uniform electric field. The most polar material moves toward the area of greatest field intensity, independent of the direction of the field and the type of applied voltage, whether A.C., D.C., or pulsating D.C., in form.

When a feed stream containing wax solids, suspended in solvent mixture, is fed to a non-uniform electric field, which field is applied by having a high voltage electrode inside a larger cylindrical grounded electrode, the lines of force are radial and the strongest part of the field is at the surface of the high voltage electrode. This type of non-uniform electric field, when imposed on a system of mixed dielectrics, is ineffective on particles of molecular size but has an appreciable effect on microscopic particles the size of precipitated wax crystals. The process takes advantage of the electrical compression of the wax on the wire which results in partial drying of the wax cake. This apparatus will permit much faster separations than normal filtration, will be less critical toward the size of the precipitated wax particles and will save substantial amounts of investment money normally spent on other means of separation.

FIGURE 1 of the drawings illustrates schematically one embodiment of the invention wherein the moving wire electrode moves upward.

FIGURE 2 of the drawings illustrates another embodiment wherein the moving wire electrode moves downward.

In accordance with the present invention, a waxy oil feed is charged to a non-uniform electric field which field is applied by having an axial high voltage wire electrode of small diameter inside a concentric grounded electrode of substantially larger diameter. The feed is charged at a rate such as to remove the desired amounts of wax from the wax slurry to obtain the desired reduction in pour point of the dewaxed oil. The ratio of the high voltage electrode surface to the grounded electrode surface is such that a maximum field intensity at the high voltage electrode is obtained consistent with the maximum area for deposition of wax particles on the high voltage wire electrode. However, if the radius of the wire electrode as compared to the grounded electrode is very small, wax particles may become charged and strongly repelled by the wire.

The intensity of the non-uniform electric field; i.e., the voltage per centimeter separation of electrodes, is such that there is a maximum attraction for the wax particles being separated at the wire electrode. The velocity of the moving wire electrode through the wax slurry is such that there is a maximum amount of wax deposited on the wire electrode consistent with the desired pour point of the oil obtained.

The temperature at which the process is carried out will depend upon the solubility of the wax in the continuous phase and the desired pour point of the dewaxed oil. The temperature will be cold enough to maintain the precipitated wax crystals in the solid state and warm enough so that the continuous phase is not so viscous as to impede the migration of the solid wax particles to the central high voltage electrode.

The pressure may vary from subatmospheric to superatmospheric and will depend upon the volatility of the continuous phase, as well as whether or not auto-refrigeration is used to maintain the wax in crystallized form in the contacting zone. Pressure will be sufficient to maintain the continuous phase in the liquid state and to allow auto-refrigeration when a auto-refrigeration solvent is employed. The crystal size of the precipitated wax will vary depending on the method by which the crystals were formed and will be such that they are strongly attracted to the high intensity field of the contacting zone. Where the wax is chilled at a controlled rate and shock chilling is prevented, the particle size will be relatively large. Where shock chilling is performed, the crystals will be relatively small and a relatively large amount of wax fines will be produced.

The length and diameter of the contacting zone; that is, the volume capacity of the unit is such that the desired volume throughput of feed may be realized at the field intensity at which the contactor is operated. The diameter of the wire electrode is selected so that there is a maximum amount of deposition of wax at the conditions of field intensity used.

In order to obtain efficient separation of the dispersed solid wax particles, a solvent of low dielectric constant may be added so that the continuous phase has a dielectric constant that is less than the dielectric constant of the wax particles being separated, thereby allowing the wax particles to migrate to the moving wire electrode. The solvent may also be used to wash solid particles collected in the contacting zone. The dielectric constant of the continuous phase may also be reduced by the addition of additives which lower the dielectric constant of the continuous phase. Also the dielectric constant of the particles can be raised by mixing additives with the material to be treated that increases the dielectric constant of the dispersed phase. In order that the solid wax particles migrate to that part of the field of greatest intensity, it is necessary that the wax particles have a dielectric constant higher than the continuous phase. The ratio of solvent to waxy oil feed will depend on the solubility of the wax in the solvent and the dewaxing temperature.

In accordance with one embodiment of this invention, the waxy oil feed containing the precipitated wax crystals is fed to a non-uniform electric field, which field is obtained by having an axial wire electrode in a cylindrical grounded vessel. The feed is fed to the top of the unit and passes countercurrently to the moving electrode which moves upward. During the passage of the wire through the contacting zone, and due to the imposed non-uniform electric field, the wax particles migrate and pack around the moving electrode. The dewaxed oil is removed from the bottom of the contacting zone. Fresh uncoated wire is always contacted with oil depleted in wax particles and is removed from the top of the contacting zone where the wax particles are in the highest concentration. The wax is removed from the contacting zone and then from the wax coated wire and is taken for further processing.

Alternatively, the feed is fed at the bottom or midpoint in the contacting zone and contacted countercurrently with a downward moving wire electrode. The wax is scraped from the wire and collects in the bottom of the contacting zone and may be washed with solvent prior to removal.

In order to obtain the separation of the solid particles from the continuous phase, the solid particle must have a dielectric constant higher than that of the continuous phase. The solvents used to dewax the oil feed stocks should be highly dielectric and, when added to the waxy oil feed, impart to the entire continuous phase a lower dielectric constant than that of the solid particles. Suitable solvents are n-alkanes, aliphatic, aromatic or halogenated aliphatic and aromatic hydrocarbons. Specific solvents are propane, butane, pentane and hexane. Certain trace additives, such as isopropanol and ammonium chloride, when added to a hydrocarbon solvent, have been found to increase the difference in dielectric constant between the continuous phase and the solid particles and to improve the separation.

A non-uniform electric field may be obtained by applying a voltage to an electrode with a small surface area which is in the vicinity of another electrode of a substantially larger surface area. The preferred type of apparatus would comprise a narrow diameter wire inner electrode centered in a cylindrical outer electrode. The wire and the walls of the contacting zone, of course, would be impervious as well as inert to the liquids charged to it. The outer electrode, for example, a glass or lined contacting zone, could be wrapped with a wire conductor or plated with a thin metal foil and connected to ground. Preferably, the outer electrode is metal tubing or pipe.

The inner electrode can be made up of a small diameter electrically conducting wire or cable. The wire is insulated from the outer electrode as well as from any other parts of the contacting zone. The wire electrode is made so as to move through the contacting zone at a controlled rate. The ratio of the area of the moving inner eletrode to the grounded outer electrode can be 0.02 to 0.25. Preferably in a commercial unit, this ratio would be 0.03 to 0.18. However, in certain experimental units, this ratio can be 0.08 to 0.16. The intensity of the non-uniform electric field is determined by the voltage applied to the high voltage electrode and the geometry of the apparatus.

The parameter defining the dielectrophoretic force at any point within the cell is the gradient of the square of the field intensity. When the ratio of the area of the inner electrode to the outer electrode is 0.02 to 0.25, the gradient of the square of the field intensity can be 1.0 to 200.0 kilovolts$^2$/cm.$^3$ at the surface of the outer electrode and 35,000 to 3,000,000 kilovolts$^2$/cm.$^3$ at the surface of the inner electrode.

Preferably, when the ratio of the area of the inner electrode to the outer electrode is 0.08 to 0.16, this parameter can have the value 15.0 to 90.0 kilovolts$^2$/cm.$^3$ at the surface of the outer electrode, and 200,000 to 1,500,000 kilovolts$^2$/cm.$^3$ at the surface of the inner electrode. However, for a ratio of the area of the inner to the outer electrode surface of 0.03 to 0.18, a gradient of the square of the field intensity at the outer electrode of 3.0 to 120.0 kilovolts$^2$/cm.$^3$, and at the surface of the inner electrode of 45,000 to 2,000,000 kilovolts$^2$/cm.$^3$, can be used.

The smallest values of the gradient of the square of the field intensity, for example, 1.0 kilovolt$^2$/cm.$^3$ at the outer electrode and 35,000 kilovolts$^2$/cm.$^3$ at the inner electrode (lower limits of the broad ranges) correspond to the minimum dielectrophoretic force which can attract wax particles to the wire from the wall of the cell when the ratio of the inner to outer electrode surface is 0.02 to 0.25. The largest values of the gradient of the square of the field intensity, 200.0 kilovolts$^2$/cm.$^3$ at the outer electrode and 3,000,000 kilovolts$^2$/cm.$^3$ at the inner electrode (upper limits of the broad ranges) correspond to the maximum permissible dielectrophoretic force that wax particles can withstand without becoming electrically charged when the ratio of the inner to outer electrode surface is 0.02 to 0.25.

The separations of this invention are caused by a dielectrophoretic force applied to particles dispersed in a continuous liquid phase. The dielectrophoretic force is proportional to the gradient of the square of the field intensity which, like field intensity, decreases from a maximum at the inner electrode to a minimum at the outer electrode. The applied voltage and cell geometry must be such that the gradient exceeds a minimum value at the outer electrode just sufficient to cause separation there. Once this minimum is established for a cell of given dimensions, it will define the minimum dielectrophoretic force required at the wall of a cell of any diameter, provided that the ratio of the inner to outer electrode surface area remains the same. However, for a given applied voltage, the center high voltage wire electrode must have a large enough diameter so that the maximum field intensity around it is insufficient to charge the particles being separated.

This process is to be distinguished from the separation processes employing electrophoresis. Electrophoresis arises from the electrostatic attraction of charged electrodes for charged particles. The direction of motion of the charged particles is dependent on the direction of the electric field. Reversal of the field reverses the direction of travel.

Dielectrophoresis as used in this invention arises because of the tendency of matter to become polarized in a non-uniform electric field and move into regions of highest field strength or intensity. The direction of movement is independent of the direction of the field and either A.C. or D.C. voltage may be effectively used. Further, in order to obtain separations the dielectric constant of the particles to be separated must be higher than that of the liquid continuous phase.

In the claimed invention, motion of the solids to be separated is due to unequal pulls exerted by the different intensities of the non-uniform field on the dipole produced in the polarized particle by the field. The particles being separated do not become charged.

The center high voltage electrode moves through the contacting zone at a rate of 0.5–600 ft./min. The velocity of the wire electrode through the contacting zone can, however, be 30–500 ft./min. and, with certain specific waxy oil feeds, will be 160–400 ft./min. The length and diameter of a particular unit, which determine its volume capacity, are not critical and will be determined solely by economic factors, the availability of high voltages, and the desired capacity throughput of a particular unit at a particular installation. The diameter of the wire high voltage electrode is important in that the smaller the diameter, the higher the field intensity at a particular applied voltage. However, the smaller the wire, the less area for wax particles to collect and adhere to. Diameters of high voltage wire electrodes of 0.02–5.0 cm. can be used, with diameters of 0.25–3.0 cm. being preferred.

In carrying out the contact of the waxy oil solvent mixture and the non-uniform electric field, the mixture can be fed to the contacting zone at a rate of 0.01 to 50 v./v./hr. Preferably, the rate is 1.0 to 25.0 v./v./hr. However, when carrying out the separation of wax from a waxy oil lubricating stock, the rate will be 8.0–15.0 v./v./hr.

The temperature of the contacting zone can be in the range of −100 to +100° F. and will be such that the precipitated wax particles stay in the solid state. However, depending upon the solvent used and its volatility, the temperature can be −40 to +30° F. Specifically, when removing wax particles from a wax oil slurry obtained from a propane dewaxing operation, the temperature will be −40° to 0° F. The pressure at which the separation is carried out is not critical as long as the continuous phase is maintained substantially in the liquid state. Pressures in the range of about 0 to 50 p.s.i.g. can be used.

The particle size of the precipitated wax crystals has some effect on their attraction to the center high voltage electrode and it is contemplated to separate particles in the size of 0.1–1000μ. Specifically, particles of the size 1–200μ will be more common in the separation of wax particles from a propane dewaxing cooling step. The ratio of solvent to waxy oil feed will vary with the solvent used and the desired pour point of the dewaxed oil. Solvent to oil ratios of 0.1/1 to 15/1 can be used, though solvent of oil ratios of 2/1 to 8/1 can also be used, but in propane dewaxing, for example, ratios of 2/1 to 5/1 are preferred.

The present invention can perhaps be better understood by referring to FIGURE 1 of the accompanying drawing which shows a schematic flow diagram of the process and apparatus used in this separation technique. A wax-containing phenol-treated lubricating oil hydrocarbon fraction which is to be dewaxed is mixed with liquid propane at a ratio of propane to oil of 2/1 to 5/1 and is conducted to a heat exchanger where it is heated to a temperature of between 130 and 150° F. The warm propane and oil solution is fed to one of two batch chillers at a temperature of about 90° F. and a pressure of about 150 p.s.i.g. The two-batch chillers are normally used alternately; one in the chilling step, and one being emptied of waxy oil slurry. The temperature in the batch chiller is gradually reduced by the withdrawal of propane vapor, which decreases the pressure, causing further vaporization of propane, thereby cooling the solution. As the oil solvent solution decreases in temperature, wax crystals are precipitated from solution.

Upon completion of the precipitation of the wax crystals in the wax chiller, the slurry of wax-oil and liquid propane is discharged from the chiller into contacting zone 2 through line 1. Since propane dewaxing is a known process, the batch chillers have been omitted from the drawing. Contacting zone 2 is surrounded by a metal tube 3 which forms the outer electrode and which is grounded by connector 5. The high voltage wire electrode 4 is positioned centrally in the cylindrical electrode 3. The high voltage electrode is insulated from the contacting zone by insulator 14 which also serves as a liquid-tight seal and by insulator 8 which also serves as vapor-tight seal. The inner electrode is an electrically conducting wire or cable of 0.25 to 3.0 cm. diameter; the outer electrode 3 has an inside diameter of 0.5–2.0 ft. A high voltage source 12 is connected through conductor 6 and electrical contact 15 to the center electrode. The ratio of the surface area of electrode 4 and electrode 3 is 0.3 to 0.18. The gradient of the square of the field intensity can be 3.0 to 120 kilovolts$^2$/cm.$^3$ at the outer electrode and 45,000 to 2,000,000 kilovolts$^2$/cm.$^3$ at the inner electrode and is provided by the high voltage source 12.

The wax-oil slurry fed through line 1 is countercurrently contacted with moving wire electrode 4 and moves downward in contacting zone 2 at a rate of 1.0 to 25.0 v./v./hr. The center wire electrode moves upward through the contacting zone at a velocity of 30–500 feet/minute. Due to the intensity of the non-uniform electric field imparted by the high voltage across the electrodes, the precipitated wax crystals, having average particle size of 1 to 200µ, migrate toward the high voltage electrode, adhere, and pack on the electrode as it moves through the contacting zone.

For propane dewaxing, the temperature of the contacting zone is maintained at a temperature of −40° to 0° F. by vaporizing some of the propane in the wax-oil slurry. The propane vapor is vented through line 9. The pressure in the contacting zone can be 0–15 p.s.i.g. In a typical commercial unit, wherein the dewaxed oil is to be used as a lubricating stock, the unit can be approximately 10 to 40 feet in length and have a diameter of about 0.5 to 2.0 ft.; the wire electrode will have a diameter of 0.25–3.0 cm. Wire electrode 4 can be unwound from the lower spool 18 and wound on the upper spool 13 or, alternatively, it can comprise a continuous wire which is moved by the rotation of pulleys and passes continuously through the contacting zone.

The slurry to be separated can be pumped countercurrently or concurrently to the moving wire. However, countercurrent operation is preferred since, as previously stated, new uncoated wire always meets depleted slurry. Instead of applying auto-refrigeration to maintain the wax-oil slurry at a temperature low enough to keep the precipitated wax particles in a solid state, external cooling, not shown, can be used.

As the wax-oil slurry charged through line 1, containing precipitated wax particles, comes into contact with the non-uniform electric field the solid wax particles migrate to the moving wire electrode, adhere to it, and move upward in the contacting zone with the moving wire electrode. The dewaxed oil is removed from the contacting zone through line 11. The dewaxed oil and solvent are separated by conventional evaporation and stripping operations, not shown. The solvent is then recycled to propane storage for reuse in the process and the dewaxed oil is sent to the refinery for further processing, such as manufacturing lube oil.

The wax adhering to moving electrode 4 passes out of the liquid continuous phase in contacting zone 2, as it moves upward through vapor liquid interface 17 and to wax removal zone 7. The removal of the wax from the oil can be achieved by scraping, by localized heat, or by letting the solid wax off radially into a collector under the influence of charging and subsequent electrostatic repulsion from the wire in a vapor or liquid region of lower dielectric constant. This occurs when the wax passes from the liquid phase into the gas phase and is repulsed from the wire. Deoiled wax is taken through 10 for further processing.

Another embodiment of the invention is described in FIG. 2 of the drawings. FIG. 2 represents an alternate method of removing adhering solids from the moving wire electrode, which is particularly useful when removing solids of greater density than the continuous phase.

The apparatus illustrated in FIG. 2 operates in the same general manner as the apparatus described in FIG. 1 except that the wire 24 moves vertically downwards along the axis of the cylindrical electrode cell 23. The slurry to be separated is pumped into the cell through a feed inlet line 21 situated about half-way up the cylinder or slightly lower. When high voltage (A.C., D.C. or pulsating D.C.) is applied to the wire by a voltage generator 32, solid particles 40 are immediately attracted to the wire and move down with it to the bottom of the cell when they are scraped off when the wire passes through the seal 28. Solids thus deposited in a layer 42 at the bottom of the cell may be pumped out by a pump, not shown, through the solids outlet 30 at a rate which will keep the depth of this layer about constant.

The liquid suspension medium 41 rises above the feed inlet 21 and any solid fines entrained with it are deposited on the uncoated, countercurrently moving wire 24 and carried to the bottom of the cell. The liquid, free of suspended solid, flows out the liquid outlet 31 at the top of the cell 23. If desired, the solid may be washed in a solvent stream entering the cell through line 39 near the bottom, either above or below the solids outlet 30.

The unit may have a gas take-off for vaporized solvent. In the top of the unit, 34 represents a vapor-tight seal and 27 a liquid gas interface. The lower portion of the cell below the feed inlet may be either larger or smaller in diameter than the upper part.

In order to simplify the drawings, the conventional dewaxing apparatus from which the feed to the contacting zone is obtained as well as the processing apparatus for the wax and oil have not been shown.

It is to be understood that the process is not to be limited by any theory of operation. Also, it is intended to include any obvious variations of the described apparatus and process, such as using more than a single high voltage moving wire electrode in a single vessel or using more than one complete unit in either parallel or series operation, in which the subsequent units could be used to treat the deoiled wax or dewaxed oil from the previous unit. The moving wire electrode can move either upward or downward, and will depend on the particular material being separated.

The contacting unit can be modified to precipitate the wax crystals in the contacting zone unit instead of in a batch chiller, for example, by providing substantially all the cooling of the waxy oil feed in this unit while, at the same time, removing the wax crystals that adhere to the moving wire electrode. In such an adaptation, cooling of the waxy oil feed and solvent mixture can be accomplished by auto-refrigeration of the solvent or by external cooling of the contacting zone.

The invention is described by the following examples but is not to be limited thereto:

*Example 1*

An apparatus to produce a non-uniform electric field was built by constructing a contacting zone having a Teflon coated high voltage center wire (0.74 millimeter in diameter with 0.30 millimeter of Teflon coating) in an electrically grounded glass tube (11 millimeters in diameter). The center electrode was insulated from the grounded glass tube. The outer electrode comprised a glass tube wrapped with copper wire, the copper wire being grounded. The electric field was imposed by applying a voltage which was varied between 10 and 30 kv. at 5 to 10 second intervals. The results obtained were compared with applying the same voltages with no modulation. Several runs were made using a wax-oil slurry of MCT–30 phenol treated distillate diluted with normal hexane. In order to determine the effect of the solvents having different dielectric constants, a difference in diameter of the center electrode, as well as the effects of using modulated and unmodulated pulsed D.C. voltage, several runs were made. The results obtained by varying the conditions are as indicated below in Table I:

using a wax slurry of MCT-30 distillate diluted with normal hexane. This is a phenol treated, waxy 30-grade TABLE I.—EFFECT OF TRACE ADDITIVES, SOLVENT AND VOLTAGE MODULATION ON SEPARATIONS IN NON-UNIFORM ELECTRIC FIELDS

| System and Dielectric Constants [1] | | Trace Additives | Cell Geometry [2] | Separation | |
|---|---|---|---|---|---|
| Solid [3] | Medium [4] | | Central Electrode | No Modulation | With Modulation |
| (a) Wax-Urea Adduct | Benzene/CCl₄ | Isopropanol | Teflon-coated 0.74 mm. diam. | Yes | |
| (b) Wax (2.25) | CCl₄ (2.24) | Urea+IPA | ____do____ | No | Yes. |
| (c) Wax (2.25) | CCl₄ (2.24) | NaCl | ____do____ | Yes | No. |
| (d) Wax (2.25) | n-Hexane (1.87) | | ____do____ | No | No. |
| (e) Wax (2.25) | n-Hexane (1.87) | | Bare, 0.3 to 1.0 mm. diam. | Yes | Yes (Improved). |

[1] Dielectric constants in Debyes in parenthesis.
[2] Inside diameter of grounded cylindrical electrode=¾″.
[3] The 7 g. of wax was obtained from 30 g. of MCT-30 distillate (mixed with 100 ml. solvent).
[4] 7 Grams of wax were mixed with 100 milliliters of the indicated solvent. The trace amounts of additive were <10 parts per 1000. Separation was carried out at a temperature of 75° F.

It was noted that some separations occurring only sluggishly in the pulsed D.C. non-uniform electric field were accomplished readily when the voltage supply was alternately increased and decreased over the range of several thousand volts. For example, suspension of wax in a CCl₄ oil solution to which were added traces of isopropyl alcohol and urea could only be separated when the applied voltage was varied between 10 and 30 kv. at intervals of 5 to 10 seconds. Unmodulated voltage produced no separation of the particles from the liquid.

Since the electric field within the grounded tube is radial, it is clear that its intensity at the central wire can be increased independently of the applied voltage if the diameter of the wire is decreased. Similarly, removal of any insulation around the central wire will give the same result. An example of this was provided by the suspension of wax in normal hexane and oil. When a wire 0.74 millimeter in diameter coated with 0.3 millimeter of Teflon was used as the central electrode, the wax was not separated even if the voltage was modulated. When part of the wire was bared of insulation, the separation proceeded rapidly only on the bare portion and was accelerated when the voltage was modulated, as previously described.

*Example 2*

A similar type apparatus to that described in Example 1 was modified to provide a moving wire center electrode. The wire moving vertically upwards through the contacting zone emerged at the top bearing its load of adherent wax. The apparatus used is similar to that described in FIG. 1 of the attached drawing. In this example, a 1.5 centimeters (inside diameter) glass tube, wrapped with an electrically grounded coil of copper wire, served as the outer electrode. The liquid-tight seal through which the wire passes on entering the lower end of the cell consisted of a nylon tube union containing neoprene and Teflon packing. Just below the seal, the wire passed between spring loaded electrical contacts carrying high voltage to the wire from a high voltage source capable of producing .1 to 30 pulsed D.C. kilovolts.

The center moving wire electrode was Chromel A, 0.020 inch in diameter, and was about 150 ft. in length. It was wound from the lower Teflon spool through the electrical contact, the liquid-tight seal, the cell and a wax collector on the top of the contacting zone, to a motor driven Teflon spool mounted above the contactor. A serum stopper placed at the top of the wax collector prevents any wax from being carried out of the wax collector. The cell temperature in the contacting zone was maintained by pumping chilled alcohol through a jacket surrounding the cell. Three runs were carried out using a wax slurry of MCT-30 distillate diluted with normal hexane. This is a phenol treated, waxy 30-grade Western Canadian lubricating oil distillate, boiling in the range of 800 to 1000° F. (In normal refinery procedure, this MCT-30 distillate is subsequently dewaxed to 25° F. pour point, to yield 80% of dewaxed oil; i.e. 20% of the distillate is removed as wax.) Various dilution ratios and operating temperatures were used, resulting in dewaxed oils having different pour points.

In each run, part of a slurry was charged to the apparatus and the remainder was filtered in conventional equipment at the same temperature used in the non-uniform electric field dewaxing. Dewaxing was carried out in the above apparatus at the prescribed temperature by passing the high voltage moving wire electrode continuously through the contacting zone. The wax was scraped from the wire electrode in a wax collecting zone and removed by a suction flask. The solvent was stripped from the dewaxed oil and a pour point was obtained. The pour point obtained by filtering the precipitated wax and, by using the non-uniform electric field contactor of this invention, are reported below in Table II:

TABLE II.—COMPARISON OF DEWAXING BY FILTRATION AND NON-UNIFORM ELECTRIC FIELD

| Dilution Ratio, w./w. | Dewaxing Temperature, ° F. | Pour/Solid of Oil, ° F. | |
|---|---|---|---|
| | | Filtered | Electrical |
| 7.1/1 | 20 | 80/75 | 80/75 |
| 3.84/1 | 2 | 50/45 | 55/50 |
| 3.76/1 | -20 | 30/25 | 35/30 |

The slight difference in the pour points obtained of about 5° of the filtered and electrically dewaxed oils is not significant in that reproducibility of ASTM pour point test is not better than 5° F. It can be seen from the above data that oils of substantially the same pour point can be obtained by carrying out the separation of the wax crystals from the wax-oil slurry in accordance with this invention and without using expensive filtering equipment.

*Example 3*

Several runs were carried out using the apparatus shown in FIGURE 2. In all cases they involved separations of precipitated wax from slurries of MTC-30 lube distillate and n-hexane, which was added to prevent total solidification at low temperatures and to reduce the dielectric constant and viscosity of the liquid suspension medium. The liquid suspension medium consists of dissolved wax, oil and hexane.

Table III below presents data obtained by passing n-hexane slurries of MCT-30 distillate in runs 1, 2, 3, and 4 and slurries of partly dewaxed MCT-30 distillate in runs 5, 6, and 7, through the apparatus in the manner described earlier. In all cases n-hexane was also pumped into the equipment through the solvent inlet. The dilution ratios given in Table III were measured in the effluent oil stream and are, therefore, representative of the dilutions maintained in the separation zone. In each case, the slurry feed rate was adjusted so that the effluent dewaxed oil-hexane solution was completely free of solid wax at the temperature of operation, and the contained dewaxed oil had the same wax content and pour point as that obtained by filtration of the slurry at the same temperature. The large difference between the pour points and dewaxing temperatures is the direct result of using n-hexane as solvent, since wax is very soluble in it.

It is seen that a high melting point wax fraction was obtained at 80° F. in a 22.7% yield based on the slack wax feed. This wax fraction contains 16.9% oil which compares with 24.2% oil in the slack wax feed and indicates that 30% of the oil has been removed from the feed. The dilution ratio shown was maintained in the separation zone and takes into account the wash solvent which was added to the system continuously at 1.67 cc./min.

The above described invention may be used to remove precipitated wax particles from wax oil slurry in order to dewax the oil, deoil the wax, or may be used to purify crude waxes by the addition of a solvent and recrystallizing the wax.

TABLE III.—DIELECTROPHORETIC DEWAXING RATES OF MCT-30 DISTILLATE AT VARIOUS TEMPERATURES

[Feed is MCT-30 Distillate—Oil Content=76.7%, Pour/Solid=130/125° F.]

| Run No. | Temperature, °F. | Solvent/Oil [1] Ratio by Weight | Waxy Oil Throughput, cc./min. | Dewaxed Oil Yield, vol. percent of waxy oil | Dewaxed Oil [2] Pour/Solid, °F. | Oil Content of Wax, wt. percent |
|---|---|---|---|---|---|---|
| 1 | 75 | 4.2/1 | 2.26 | 76 | 115/110 | 68.0 |
| 2 | 32 | 4.0/1 | 0.61 | 44 | 80/75 | 76.0 |
| 3 | 32 | 5.1/1 | 0.90 | 39 | 80/75 | 75.1 |
| 4 | −10 | 4.3/1 | 0.24 | 45 | 45/40 | 76.2 |

[Feed is MCT-30 Distillate Dewaxed at 32° F.—Oil Content 84.8%, Pour/Solid=80/75° F.]

| Run No. | Temperature, °F. | Solvent/Oil Ratio by Weight | Waxy Oil Throughput, cc./min. | Dewaxed Oil Yield, vol. percent of waxy oil | Dewaxed Oil Pour/Solid, °F. | Oil Content of Wax, wt. percent |
|---|---|---|---|---|---|---|
| 5 | −10 | 5.6/1 | 0.73 | 75 | 50/45 | 79.7 |
| 6 | −10 | 5.0/1 | 1.23 | 52 | 55/50 | 81.0 |
| 7 | −30 | 5.7/1 | 0.27 | 41 | 35/30 | 84.4 |

[1] Including wash solvent.
[2] The large difference between the pour points and dewaxing temperature is due to using n-hexane as a solvent since wax is very soluble in it.

An auto-refrigerative solvent, such as propane, may be used to diminish external refrigeration costs. Also, propane is expected to promote dielectrophoresis even more than n-hexane because of its lower dielectric constant and viscosity.

From the waxy oil feed throughputs and the dewaxed oil yields, it can be seen that the rate of dewaxing decreases with temperature. This is due in part to the increased amount of precipitated wax present at lower temperatures, and also to a decrease in efficiency of wax removal. Runs 5, 6, and 7 when compared with runs 2, 3, and, 4 show that the dewaxing process would be more efficient at lower temperatures if the feed was dewaxed in two stages; for example, at 32° F., then −10° F. or −30° F.

*Example 4*

The generally high oil contents of the waxes of Example 3 reflect low yields of dewaxed oils. It would, therefore, be desirable to incorporate a deoiling stage into such a dewaxing process in order to obtain more economic yields. Such a deoiling stage could consist of a second unit of either the design shown in FIGURE 1 or FIGURE 2 of the drawings. Table IV below presents data from the deoiling and fractionation of MCT-30 slack wax which is the wax product obtained from MCT-30 lube stocks at a commercial ketone dewaxing plant.

The invention can be used to separate solids from other liquids or gases. For example, scale or dirt may be removed from refinery liquid and gas streams, polymeric particles can be removed from petrochemical streams and asphaltenes can be removed from suspension in various liquids. Though the invention is illustrated by vertical moving wire electrodes, it is to be understood that the moving wire electrode can also be used moving in a horizontal plane or any angle thereto.

The invention is not to be limited by the above description or by any theory of operation, but is to be coextensive of the scope of the following claims.

What is claimed is:

1. A process of separating precipitated wax particles from a dispersion of said particles in a liquid diluent comprising contacting the dispersion with a non-uniform electrical field comprising a moving wire high voltage electrode, said wax particles migrating and adhering to the moving wire electrode by virtue of the applied non-uniform field and being removed from the contacting zone.

2. A process of separating precipitated wax particles from a mixture of dissolved wax, oil and solvent, containing said particles, comprising contacting said mixture with a non-uniform electric field wherein a moving wire electrode comprises the high voltage electrode and the outside walls of the contacting zone comprise the grounded

TABLE IV.—DEOILING OF MCT-30 SLACK WAX IN A NON-UNIFORM ELECTRIC FIELD

| Deoiling Temperature, °F. | Solvent/Oil Ratio by Weight | Slack Wax Feed Rate, cc./min. | Hexane Wash Rate, cc./min. | Wax Yield, percent of Slack Wax Feed | Congealing Point of Wax, °F. | Oil Content of Wax, wt. percent |
|---|---|---|---|---|---|---|
| 80 | 5.7/1 | 1.87 | 1.67 | 22.7 | 163 | 16.9 |
| For Comparison: MCT-30 Slack Wax, Feed to above deoiling | | | | | 148 | 24.2 |
| Deoiled MCT-30 Slack Wax, 100% wax recovery | | | | | 154 | 1.9 | electrode, wherein the wax particles migrate and adhere to the moving wire electrode and are thereby removed from said oil solvent mixture.

3. The process of claim 2 wherein the particles become polarized and move towards the region of highest field intensity.

4. The process of claim 2 wherein said mixture has a dielectric constant less than the particles being separated.

5. The process of claim 2 wherein the moving wire electrode moves counter to the flow of feed, and the wax particles which adhere to the wire are scraped from the wire, collecting in the bottom of the contacting zone, and are contacted with a wash solvent.

6. The process of claim 2 wherein the ratio of the area of high voltage wire electrode to the area of the grounded electrode is 0.02 to 0.25.

7. The process of claim 2 wherein the gradient of the square of the field intensity is 1.0 to 200.0 kilovolts$^2$/cm.$^3$ at the surface of the outer electrode and 35,000 to 3,000,000 kilovolts$^2$/cm.$^3$ at the surface of the inner electrode.

8. The process of claim 2 wherein the rate of feeding the wax oil solvent mixture to the contacting zone is 8.0–15.0 v./v./hr.

9. A process of separating precipitated wax particles from a mixture comprising said particles, waxy oil and a solvent which comprises contacting the mixture at a temperature of +20 to −30° F. with a non-uniform electric field in a contacting zone having an outer electrode of 1.5 cm. inside diameter, a moving wire electrode 0.02 inch in diameter, wherein said electric field is imposed by applying a voltage of 100 to 30,000 pulsating D.C. volts across the electrodes, and the wax particles by virtue of the applied field are caused to migrate and adhere to the moving wire electrode and are removed thereby from the mixture.

10. A process of claim 9 wherein the feed comprises a wax slurry of MCT–30 distillate diluted with normal hexane.

11. The process of claim 9 wherein the electric field is imposed by applying one of the electrical voltages from the group comprising A.C., D.C., and pulsed D.C.

12. The process of claim 11 where the average or R.M.S. voltage is modulated.

13. The process of claim 2 wherein the solvent is propane.

References Cited by the Examiner

UNITED STATES PATENTS

| | | | |
|---|---|---|---|
| 1,589,329 | 6/1926 | Sheppard et al. | 204—183 |
| 1,884,110 | 10/1932 | Morehouse | 204—183 |
| 2,042,758 | 6/1936 | Aldridge et al. | 204—184 |
| 2,107,770 | 2/1938 | Wade | 204—183 |
| 2,109,125 | 2/1938 | Aldridge et al. | 204—184 |
| 2,109,350 | 2/1938 | Dillon | 204—184 |
| 2,127,413 | 8/1938 | Leguillon | 204—183 |
| 2,300,283 | 10/1942 | Fisher | 204—184 |
| 2,338,795 | 1/1944 | Berquist | 204—206 |
| 2,665,246 | 1/1954 | Bates | 204—184 |
| 2,695,269 | 11/1954 | De Witz et al. | 204—206 |
| 2,996,442 | 8/1961 | Eberly et al. | 204—184 |

OTHER REFERENCES

Pohl, Scientific American, "Nonuniform Electric Fields," vol. 203, No. 6, December 1960, pages 107–116.

Pohl et al., Electrochemical Society Journal, "Particle Separation by Nonuniform Electric Fields in Liquid Dielectrics Batch Methods," volume 107, No. 5, 1960, pages 383–385.

Pohl, Electrochemical Society Journal, "Nonuniform Field Effects in Poorly Conducting Media," volume 107, No. 5, 1960, pages 386–390.

Pohl et al., Electrochemical Society Journal, "Continuous Separations by Nonuniform Electric Fields in Liquid Dielectrics," volume 107, No. 5, 1960, pages 390–396.

JOHN H. MACK, *Primary Examiner.*

JOHN R. SPECK, *Examiner.*

G. KAPLAN, J. BATTIST, E. ZAGARELLA,
*Assistant Examiners.*